United States Patent
Tong et al.

(10) Patent No.: US 11,249,931 B2
(45) Date of Patent: Feb. 15, 2022

(54) PIN MULTIPLEXER AND METHOD FOR CONTROLLING PIN MULTIPLEXER

(71) Applicant: Realtek Semiconductor Corp., HsinChu (TW)

(72) Inventors: Li Tong, Suzhou (CN); Zuohui Peng, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 69 days.

(21) Appl. No.: 16/812,362

(22) Filed: Mar. 8, 2020

(65) Prior Publication Data

US 2020/0301862 A1     Sep. 24, 2020

(30) Foreign Application Priority Data

Mar. 20, 2019    (CN) .......................... 201910214858.0
Mar. 26, 2019    (TW) ................................ 108110484

(51) Int. Cl.
| | | |
|---|---|---|
| G06F 13/40 | (2006.01) | |
| G06F 13/42 | (2006.01) | |
| G06F 13/10 | (2006.01) | |

(52) U.S. Cl.
CPC ........ *G06F 13/4022* (2013.01); *G06F 13/102* (2013.01); *G06F 13/4208* (2013.01)

(58) Field of Classification Search
CPC . G06F 13/4022; G06F 13/4208; G06F 13/102
See application file for complete search history.

(56) References Cited

U.S. PATENT DOCUMENTS

| | | | |
|---|---|---|---|
| 5,822,246 A * | 10/1998 | Taub ...................... | G11C 5/143 |
| | | | 365/185.18 |
| 6,044,412 A | 3/2000 | Evoy | |
| 8,930,594 B1 | 1/2015 | Rodman et al. | |
| 9,756,404 B2 | 9/2017 | Raza | |
| 2004/0197047 A1 * | 10/2004 | Hadba ................... | G06F 13/409 |
| | | | 385/17 |
| 2005/0223121 A1 | 10/2005 | Tsai | |
| 2008/0152024 A1 * | 6/2008 | Takeuchi .............. | H04L 5/1415 |
| | | | 375/257 |

(Continued)

FOREIGN PATENT DOCUMENTS

TW         201832089 A       9/2018

*Primary Examiner* — Farley Abad
(74) *Attorney, Agent, or Firm* — Winston Hsu

(57) ABSTRACT

The present invention provides a pin multiplexer including a multiplexing circuit, a control circuit and a detecting circuit. The multiplexing circuit includes a first port, a second port and a third port, wherein the first port, the second port and the third port are coupled to a first device, a second device and a third device, respectively. The control circuit is configured to control the multiplexing circuit to operate in a first mode or a second mode, wherein when the multiplexing circuit operates in the first mode, the first port is coupled the second port; and when the multiplexing circuit operates in the second mode, the first port is coupled to the third port. When operating in the second mode, the detecting circuit detects a signal of the first port to generate a detection result for dynamically switching the data transmission direction between the third device and the first device.

12 Claims, 4 Drawing Sheets

(56) References Cited

U.S. PATENT DOCUMENTS

| | | | |
|---|---|---|---|
| 2008/0195806 A1* | 8/2008 | Cope | G06F 13/1684 |
| | | | 711/111 |
| 2008/0256588 A1* | 10/2008 | He | H04N 21/4382 |
| | | | 725/131 |
| 2010/0049900 A1* | 2/2010 | Chiou | G06F 8/65 |
| | | | 711/103 |
| 2018/0188768 A1* | 7/2018 | Skjoldborg | G06F 13/4273 |

* cited by examiner

PIN MULTIPLEXER AND METHOD FOR CONTROLLING PIN MULTIPLEXER

BACKGROUND OF THE INVENTION

1. Field of the Invention

The present invention relates to a pin multiplexer.

2. Description of the Prior Art

In chip design, in order to have as many functions as possible for the pins, a pin multiplexer is often used to switch the function of the pin(s). The current pin multiplexer sets the function of the pin(s) before the signal starts to be transmitted, however, since the pin function cannot be switched during the signal transmission, it cannot be applied to complicated transmissions such as bidirectional data transmission. In addition, if it is to be applied to a complicated transmission such as the bidirectional data transmission, the device may be necessary to set some dedicated pins, which increases the manufacturing cost.

SUMMARY OF THE INVENTION

It is therefore an objective of the present invention to provide a pin multiplexer, which can dynamically switch the pin functions to change the data transmission direction during data transmission between two electronic devices, to solve the above-mentioned problems.

According to one embodiment of the present invention, a pin multiplexer is disclosed, wherein the pin multiplexer comprises a multiplexing circuit, a control circuit and a detecting circuit. The multiplexing circuit comprises a first port, a second port and a third port, wherein each of the first port, the second port and the third port comprises a plurality of pins, and the pins of the first port, the second port and the third ports are coupled to a first device, a second device and a third device via a plurality of interface circuits, respectively. The control circuit is arranged to control the multiplexing circuit to operate in a first mode or a second mode, wherein when the multiplexing circuit operates in the first mode, the first port is connected to the second port; and when the multiplexing circuit operates in the second mode, the first port is connected to the third port. In addition, when the multiplexing circuit operates in the second mode, the detecting circuit dynamically switches a data transmission direction between the first device and the third device during a data transmission between the third device and the first device by detecting signal(s) of a portion of the pins of the first port or signal(s) of the interface circuits coupled to the portion of the pins.

According to another embodiment of the present invention, a method for controlling a pin multiplexer is disclosed, wherein the pin multiplexer comprises a multiplexing circuit, the multiplexing circuit comprises a first port, a second port and a third port, wherein each of the first port, the second port and the third port comprises a plurality of pins, and the pins of the first port, the second port and the third ports are coupled to a first device, a second device and a third device via a plurality of interface circuits, respectively; and the method comprises the steps of: controlling the multiplexing circuit to operate in a first mode or a second mode, wherein when the multiplexing circuit operates in the first mode, the first port is connected to the second port; and when the multiplexing circuit operates in the second mode, the first port is connected to the third port; and when the multiplexing circuit operates in the second mode, dynamically switching a data transmission direction between the first device and the third device during a data transmission between the third device and the first device by detecting signal(s) of a portion of the pins of the first port or signal(s) of the interface circuits coupled to the portion of the pins.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
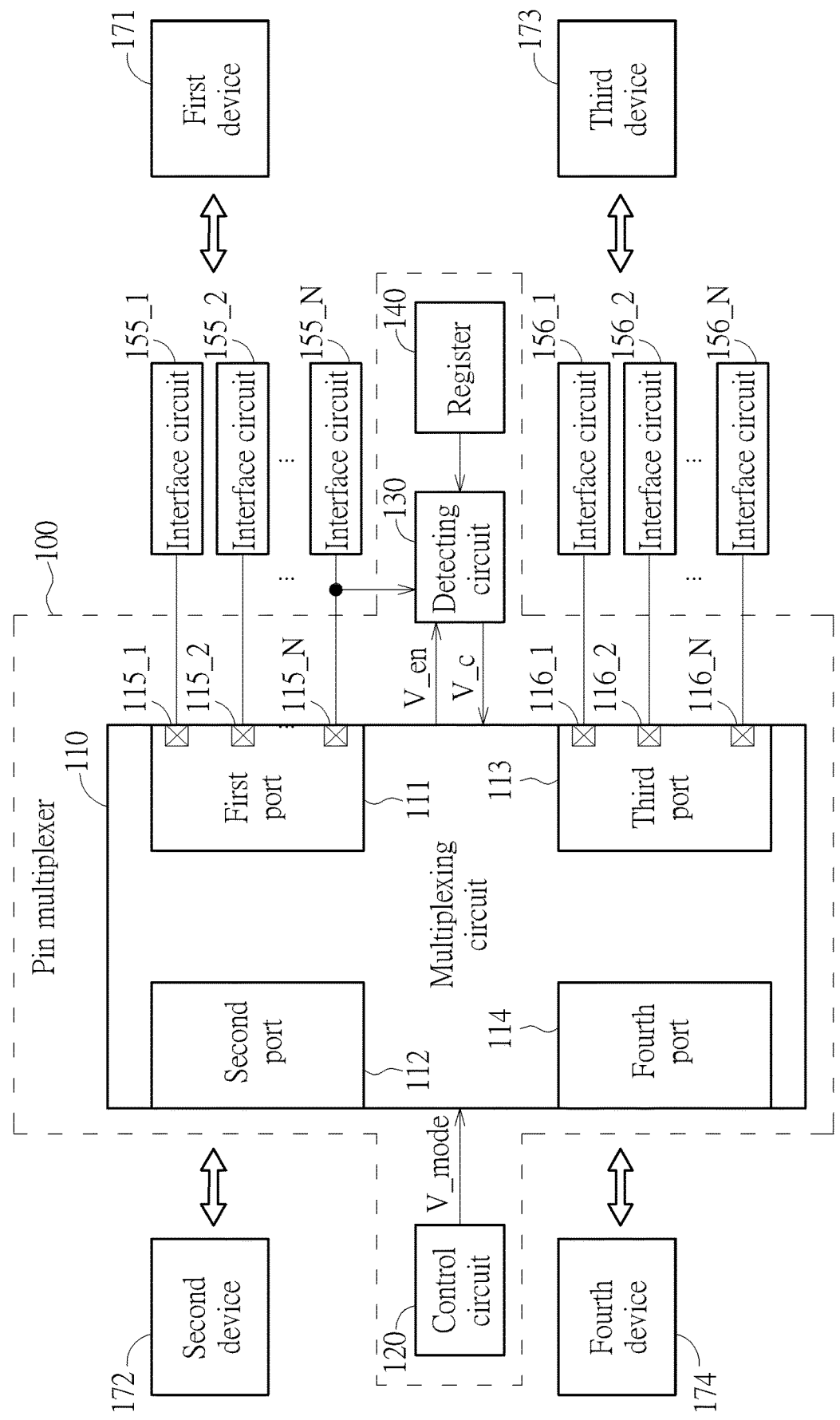
FIG. 1 is a diagram illustrating a pin multiplexer according to one embodiment of the present invention.

FIG. 1 is a diagram illustrating a pin multiplexer 100 according to one embodiment of the present invention. As shown in FIG. 1, the pin multiplexer 100 comprises a multiplexing circuit 110, a control circuit 120, a detecting circuit 130 and a register 140, wherein the multiplexing circuit 110 comprises a first port 111, a second port 112, a third port 113 and a fourth port 114, and each of the first port 111, the second port 112, the third port 113 and the fourth port 114 comprises a plurality of pins such as the pins 115_1-115_N of the first port 111 and the pins 116_1-116_N of the third port 113.

The first port 111, the second port 112, the third port 113 and the fourth port 114 of the pin multiplexer 100 are used to connect to a first device 171, a second device 172, a third device 173 and a fourth device 174, respectively. For example, the pins 115_1-115_N of the first port 111 are connected to the first device 171 via interface circuits 155_1-155_N, and the pins 116_1-116_N of the third port 113 are connected to the third device 173 via interface circuits 156_1-156_N for the data transmission between the devices, wherein each of the interface circuits 155_1-155_N and 156_1-156_N may comprises a transceiver circuit (comprising a transmitting circuit and a receiving circuit) and a pad. In one embodiment, the multiplexing circuit 110 can operate in a first mode or a second mode, wherein when the multiplexing circuit 110 operates in the first mode, the first port 111 is connected to the second port 112 for the communications between the first device 171 and the second device 172, and the third port 113 is connected to the fourth port 114 for the communications between the third device 173 and the fourth device 174. In addition, when the multiplexing circuit 110 operates in the second mode, the first port 111 is connected to the third port 113 for the communications between the first device 171 and the third device 173, and the second port 112 and the fourth port 114 may not need to perform any operation, and each of the second device 172 and the fourth device 174 does not communicate with another device via the pin multiplexer 100.

Specifically, the pin multiplexer 100 can refer to a user's control or other control manners to make the control circuit 120 generate a mode control signal V_mode to the multiplexing circuit 110, so that the multiplex circuit 110 operates in the first mode or the second mode. When the multiplexing circuit 110 operates in the first mode, because the first port 111 is connected to the second port 112, and the third port 113 is connected to fourth port 114, the first device 171 can communicate with the second device 172 via the pin multiplexer 100, and the third device 173 can communicate with the fourth device 174 via the pin multiplexer 100. In the second mode, because the first port 111 is connected to the third port 113, the first device 171 can communicate with the third device 173 via the pin multiplexer 100. In addition, in the second mode, the multiplexing circuit 110 generates an enable signal V_en to the detecting circuit 130 so that the detecting circuit 130 starts the configuration by loading configuration data from the register 140, and the detecting circuit 130 starts to detect signals of at least a portion of the pins or the corresponding interface circuit (FIG. 1 shows detecting the signal of the pin 115_N, but it's not a limitation of the present invention) for dynamically switching the data transmission direction between the third device 173 and the first device 171 during the data transmission between the third device 173 and the first device 171. For example, assuming that the third device 173 transmits data to the first device 171 via the pin multiplexer 100 at the beginning of the second mode, the detecting circuit 130 can continuously detect whether the signal on at least the portion of the pins of the first port 111 conforms to a specific pattern or not, and if the detecting circuit 130 detects that the signal conforms to the specific pattern, the detecting circuit 130 generates a control signal Vc to the multiplexing circuit 110 to control/change the data transmission direction of a portion of the interface circuit 155_1-155_N, so as to make the first device 171 able to directly transmit the data to the third device 173 via the interface circuits 155_1-155_N and the pin multiplexer 100.

Figure 2:
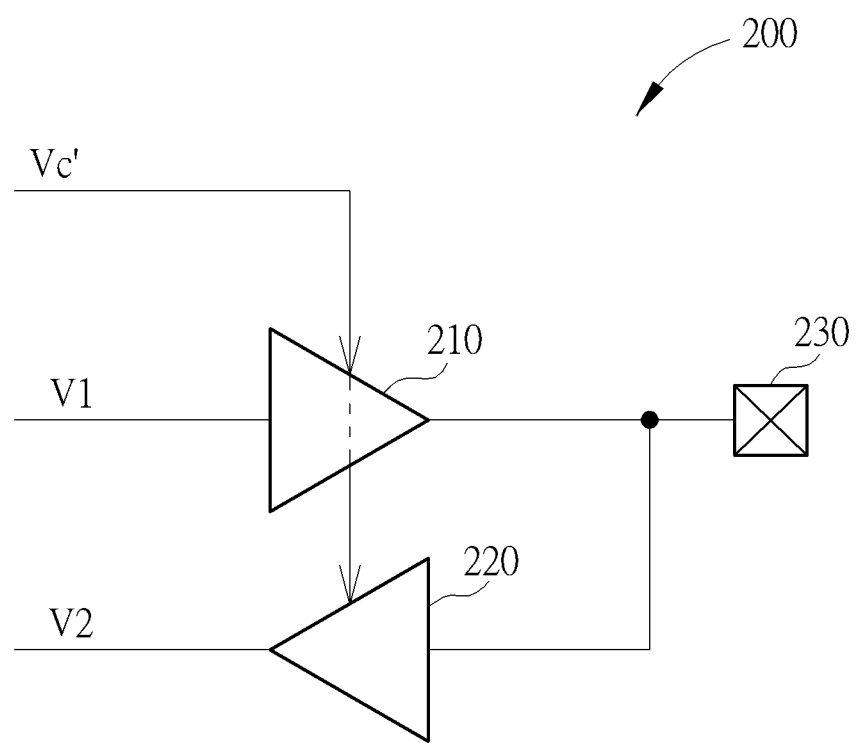
FIG. 2 is a diagram illustrating an interface circuit according to one embodiment of the present invention.

FIG. 2 is a diagram illustrating an interface circuit 200 according to one embodiment of the present invention, wherein the interface circuit 200 can be applied to at least part of the interface circuits 155_1-155_N and 156_1-156_N. As shown in FIG. 2, the interface circuit 200 comprises two buffers 210 and 220 serving as the transceiver circuit, and a pad 230. Taking the interface circuit 155_N as an example, the pad 230 can be connected to the first device 171, and the buffers 210 and 220 can be controlled by a control signal Vc' generated according to the control signal Vc outputted by the detecting circuit 130. In detail, at the beginning of the second mode, the multiplexing circuit 110 can generate the control signal Vc' to enable the buffer 210 and disable the buffer 220, so that the third device 173 transmits a signal V1 to the first device 171 via the pin multiplexer 100 and the buffer 210 and the pad 230 of the interface circuit 155_N; and when the detecting circuit 130 determines that the detected signal conforms to the specific pattern and generates the control signal Vc to the multiplexing circuit 110, the multiplexing circuit 110 may generate the control signal Vc' to disable the buffer 210 and enable the buffer 220, so that the third device 173 receives a signal V2 from the first device 171 via the pin multiplexer 100 and the buffer 220 and the pad 230 of the interface circuit 155_N.

As described in the above embodiment, the pin multiplexer 100 can dynamically switch the signal/data transmission direction during the data transmission, and the timing of the switching is controlled by a dedicated hardware circuit (i.e. the detecting circuit 130), so that the two electronic devices that perform signal transmission can recognize that the pins are exclusive to each other. Therefore, the pin multiplexer 100 can support a complicated signal transmission mode of the transmission protocol, and it is also facilitating the reduction of the dedicated pins, to minimize the number of the pins of the chip and reduce the manufacturing costs.

In one embodiment, the first device 171 may be a flash memory that conforms to a Serial Peripheral Interface (SPI) specification, the second device 172 may be a flash memory controller for controlling the first device 171, the third device 173 is pluggable device such as a memory card or a programmer, and the fourth device 174 may be a memory card controller for controlling the memory card. In this embodiment, the first port 111 comprises six pins 115_1-115_6 respectively corresponding to six interface circuits 155_1-155_6, and the third port 113 comprises six pins 116_1-116_6 respectively corresponding to six interface circuits 156_1-156_6.

In this embodiment, when the third device 173 is a memory card, the control circuit 120 generates the mode control signal V_mode (e.g. V_mode=0) to make the pin multiplexer 100 operate in the first mode, and the flash memory controller (i.e. the first device 171) can access the flash memory (i.e. the first device 171) via the first port 111 and the second port 112 of the pin multiplexer 100, and the memory card controller (i.e. the fourth device 174) can access the memory card (i.e. the third device 173) via the third port 113 and the fourth port 114 of the pin multiplexer 100. In this embodiment, when the third device 173 is the memory card and the pin multiplexer 100 operates in the first mode, the six pins 116_1-116_6 of the third port 113 may correspond to a clock signal SD_CLK, a command signal SD_CMD and four data signals SD_D0, SD_D1. SD_D2 and SD_D3. Because a person skilled in the art should understand the functions of the above signals in the memory card specification, further descriptions are omitted here. In addition, when the third device 173 is a programmer, the control circuit 120 generates the mode control signal V_mode (e.g. V_mode=1) to make the pin multiplexer 100 operate in the second mode, and the programmer (i.e. the first device 173) can access the flash memory (i.e. the first device 171) via the first port 111 and the third port 113 of the pin multiplexer 100. In this embodiment, when the third device 173 is the memory card and the pin multiplexer 100 operates in the second mode, the six pins 116_1-116_6 of the third port 113 may correspond to a clock signal SPI_CLK, a chip select signal SPI_CSB and four data signals SPI_D0, SPI_D1, SPI_D2 and SPI_D3 of the SPI protocol. Because a person skilled in the art should understand the functions of the above signals in the SPI flash memory, further descriptions are omitted here.

In this embodiment, when the third device 173 is the programmer, the third device 173 can quickly erase, program or verify the flash memory (i.e., the first device 171).

Figure 3:
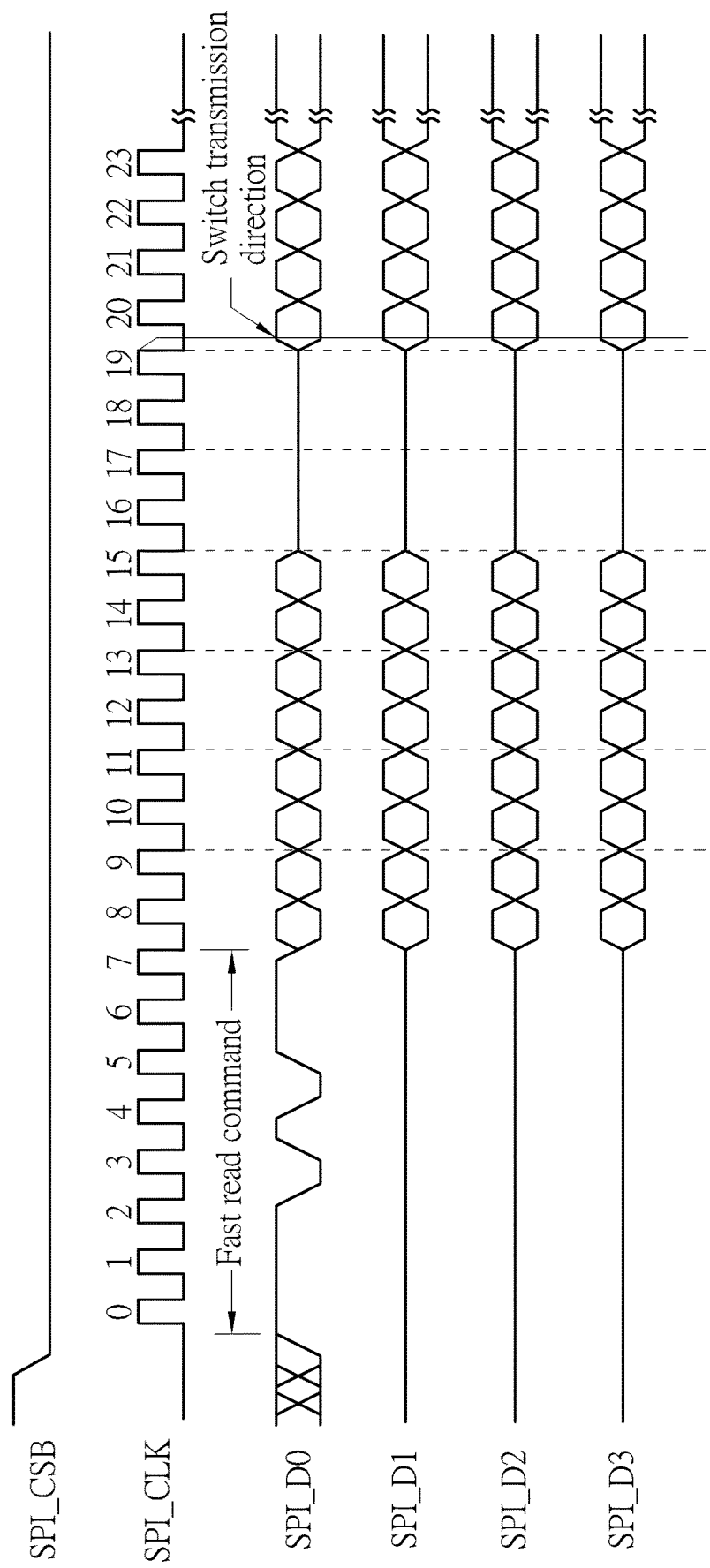
FIG. 3 is a timing diagram of a clock signal, a chip select signal and four data signals.

In this embodiment, when the third device 173 is the programmer and the pin multiplexer 100 operates in the second mode, the detecting circuit 130 can use the clock signal SPI_CLK and the chip select signal SPI_CSB to detect the pattern of the data signal SPI_D0 to determine if switching the transmission direction between the programmer and the flash memory. Specifically, referring to FIG. 1 and FIG. 3 together, FIG. 3 shows the timing diagram of the clock signal SPI_CLK, the chip select signal SPI_CSB and the four data signals SPI_D0, SPI_D1, SPI_D2 and SPI_D3. In the beginning, the pin multiplexer 100 controls the interface circuits 155_1-155_6 and 156_1-156_6 to make the programmer transmit data to the flash memory, and if the detecting circuit 130 detects that the data signal SPI_D0 has a fast read command (i.e. meets the specific pattern) during the 0-7$^{th}$ cycles of the clock signal SPI_CLK, the detecting circuit 130 can determine that flash memory will receive the data signal SPI_D0 having the address information during the 8$^{th}$-13$^{th}$ cycles of the clock signal SPI_CLK and the dummy information during the 14$^{th}$-19$^{th}$ cycles of the clock signal SPI_CLK, and the detecting circuit 130 can further determine that flash memory starts to transmit data to the programmer after the 19$^{th}$ cycle of the clock signal SPI_CLK. Therefore, the detecting circuit 130 can transmit the control signal Vc to the multiplexing circuit 110 at the 19$^{th}$ cycle of the clock signal SPI_CLK, to make the multiplexing circuit 110 generate the control signal Vc' to switch the transmission direction of the interface circuits 155_3-155_6 and 156_3-156_6, so that the flash memory can transmit data signals SPI_D0, SPI_D1, SPI_D2 and SPI_D3 to the programmer via the interface circuits 155_3-155_6 and the pins 115_3-115_6 of the first port 111. In addition, after the read operation finishes, the programmer can change a voltage level of the chip select signal SPI_CSB (e.g. from "0" to "1"), and when the detecting circuit 130 detects this action, the control signal Vc can be transmitted to the multiplexing circuit 111 to restore the original transmission direction.

In one embodiment, the detecting circuit 130 can turn off the detection of the data signal SPI_D0 when detecting the fast read command as shown in FIG. 3, and the detecting circuit 130 starts to detect data signal SPI_D0 when detecting that the level of the chip select signal SPI_CSB changes, to prevent the malfunction of detection circuit 130 caused by the signal variation on the data signal SPI_D0.

Figure 4:
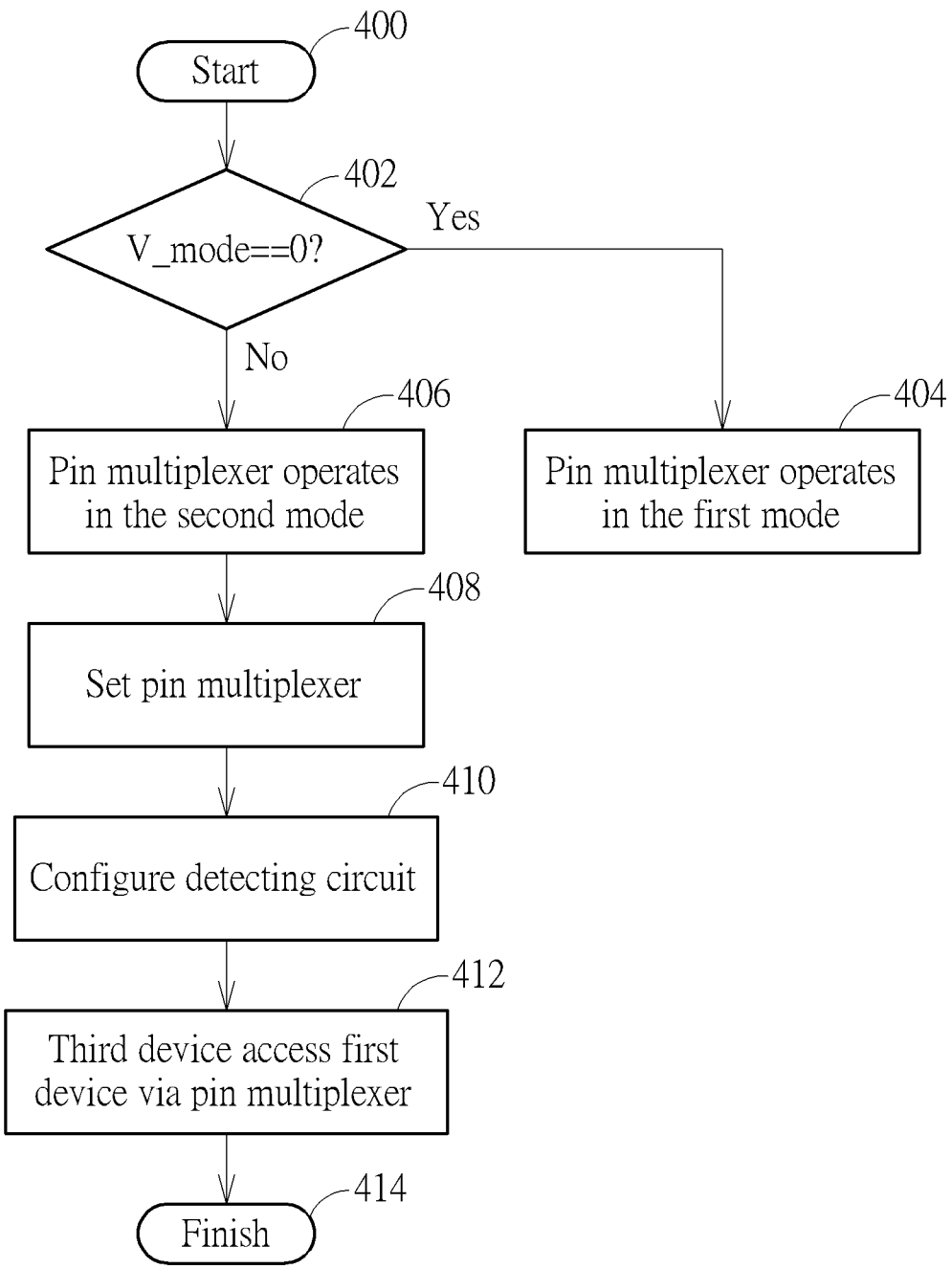
FIG. 4 is a flowchart of a method for controlling a pin multiplexer according to one embodiment of the present invention.

FIG. 4 is a flowchart of a method for controlling a pin multiplexer according to one embodiment of the present invention. Referring to FIGS. 1-4 and above disclosure, the flow is described as follows.

Step 400: the flow starts.

Step 402: determine if the mode control signal V_mode is equal to "0". If yes, the flow enters Step 404; if not, the flow enters Step 406.

Step 404: the pin multiplexer operates in the first mode.

Step 406: the pin multiplexer operates in the second mode.

Step 408: set the pin multiplexer.

Step 410: configure the detecting circuit.

Step 412: the third device access the first device via the pin multiplexer.

Step 414: the flow finishes.

Briefly summarized, in the pin multiplexer of the present invention, a special hardware circuit is used to detect whether a signal on a pin or an interface circuit conforms to a specific pattern, and dynamically switches the signal transmission direction of the pin and the interface circuit accordingly. By using the switching mechanism of the present invention, the pin multiplexer can support the complicated transmission mode of the transmission protocol, and also reduce the number of dedicated pins to minimize the number of pins of the chip and reduce the manufacturing cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pin multiplexer, comprising:
    a multiplexing circuit comprising a first port, a second port and a third port, wherein each of the first port, the second port and the third port comprises a plurality of pins, and the pins of the first port, the second port and the third port are arranged to couple to a first device, a second device and a third device via a plurality of interface circuits, respectively, respectively;
    a control circuit, for controlling the multiplexing circuit to operate in a first mode or a second mode, wherein when the multiplexing circuit operates in the first mode, the first port is coupled to the second port; and when the multiplexing circuit operates in the second mode, the first port is coupled to the third port; and
    a detecting circuit, wherein when the multiplexing circuit operates in the second mode, the detecting circuit dynamically switches a data transmission direction between the first device and the third device during a data transmission between the third device and the first device by detecting a signal of a portion of the pins of the first port or a signal of the interface circuit corresponding to the portion of the pins;
    wherein when the multiplexing circuit operates in the second mode, the third device transmits data to the first device via the portion of the pins of the first port of the multiplexing circuit and when the detecting circuit detects that the signal of the portion of the pins or the interface circuit has a specific pattern, the detecting circuit generates a control signal to make the first device transmit data to the third device via the portion of the pins of the first port of the multiplexing circuit.

2. The pin multiplexer of claim 1, wherein when the multiplexing circuit operates in the first mode, the detecting circuit does not detect the signal of the portion of the pins of the first port or the signal of the interface circuit.

3. The pin multiplexer of claim 1, wherein the interface circuit corresponding to each of the portion of the pins comprises a transceiver circuit; and when the detecting circuit detects that the signal on the portion of the pins or the interface circuit has the specific pattern, the detecting circuit generates the control signal to control the transceiver circuit to make the first device transmit the data to the third device via the portion of the pins of the first port of the multiplexing circuit.

4. A pin multiplexer, comprising:
    a multiplexing circuit comprising a first port, a second port and a third port, wherein each of the first port, the second port and the third port comprises a plurality of pins, and the pins of the first port, the second port and the third port are arranged to couple to a first device, a second device and a third device via a plurality of interface circuits, respectively, respectively;
    a control circuit, for controlling the multiplexing circuit to operate in a first mode or a second mode, wherein when the multiplexing circuit operates in the first mode, the first port is coupled to the second port; and when the multiplexing circuit operates in the second mode, the first port is coupled to the third port; and
    a detecting circuit, wherein when the multiplexing circuit operates in the second mode, the detecting circuit dynamically switches a data transmission direction between the first device and the third device during a data transmission between the third device and the first device by detecting a signal of a portion of the pins of the first port or a signal of the interface circuit corresponding to the portion of the pins;
    wherein the multiplexing circuit further comprises a fourth port, and pins of the fourth port are coupled to a fourth device via a plurality of interface circuits; and when the multiplexing circuit operates in the first mode, the third port is coupled to the fourth port.

5. The pin multiplexer of claim 4, wherein the first device is a flash memory, the second device is a flash memory controller, the third device is a memory card or a programmer, and the fourth device is a memory card controller.

6. The pin multiplexer of claim 5, wherein when the third device is the memory card, the control circuit controls the multiplexing circuit to operate in the first mode so that the flash memory controller couples to the flash memory via the multiplexing circuit, and the memory card controller couples to the memory card; and when the third device is the programmer, the control circuit controls the multiplexing circuit to operate in the second mode to make the programmer couple to the flash memory via the multiplexing circuit.

7. A method for controlling a pin multiplexer, wherein the pin multiplexer comprises a multiplexing circuit, the multiplexing circuit comprises a first port, a second port and a third port, wherein each of the first port, the second port and the third port comprises a plurality of pins, and the pins of the first port, the second port and the third ports are coupled to a first device, a second device and a third device via a plurality of interface circuits, respectively; and the method comprises the steps of:
controlling the multiplexing circuit to operate in a first mode or a second mode, wherein when the multiplexing circuit operates in the first mode, the first port is connected to the second port; and when the multiplexing circuit operates in the second mode, the first port is connected to the third port; and
when the multiplexing circuit operates in the second mode, dynamically switching a data transmission direction between the first device and the third device during a data transmission between the third device and the first device by detecting a signal of a portion of the pins of the first port or a signal of the interface circuit corresponding to the portion of the pins;
wherein the step of dynamically switching the data transmission direction between the first device and the third device during the data transmission between the third device and the first device by detecting the signal of the portion of the pins of the first port or the signal of the interface circuit coupled to the portion of the pins comprises:

when the multiplexing circuit operates in the second mode, the third device transmits data to the first device via the portion of the pins of the first port of the multiplexing circuit; and
when it is detected that the signal of the portion of the pins or the interface circuit has a specific pattern, generating a control signal to make the first device transmit data to the third device via the portion of the pins of the first port of the multiplexing circuit.

8. The method of claim 7, further comprising:
when the multiplexing circuit operates in the first mode, not detecting the signal of the portion of the pins of the first port or the signal of the interface circuit.

9. The method of claim 7, wherein the interface circuit corresponding to each of the portion of the pins comprises a transceiver circuit, and the step of when it is detected that the signal on the portion of the pins or the interface circuit has the specific pattern, generating the control signal to make the first device transmit data to the third device via the portion of the pins of the first port of the multiplexing circuit comprises:
When it is detected that that the signal on the portion of the pins or the interface circuit has the specific pattern, generating the control signal to control the transceiver circuit to make the first device transmit the data to the third device via the portion of the pins of the first port of the multiplexing circuit.

10. The method of claim 7, wherein the multiplexing circuit further comprises a fourth port, and pins of the fourth port are coupled to a fourth device via a plurality of interface circuits; and when the multiplexing circuit operates in the first mode, the third port is coupled to the fourth port.

11. The method of claim 10, wherein the first device is a flash memory, the second device is a flash memory controller, the third device is a memory card or a programmer, and the fourth device is a memory card controller.

12. The method of claim 11, further comprising:
when the third device is the memory card, controlling the multiplexing circuit to operate in the first mode so that the flash memory controller couples to the flash memory via the multiplexing circuit, and the memory card controller couples to the memory card; and
when the third device is the programmer, controlling the multiplexing circuit to operate in the second mode to make the programmer couple to the flash memory via the multiplexing circuit.

* * * * *